United States Patent [19]
Vinegar et al.

[11] Patent Number: 5,190,405
[45] Date of Patent: Mar. 2, 1993

[54] VACUUM METHOD FOR REMOVING SOIL CONTAMINANTS UTILIZING THERMAL CONDUCTION HEATING

[75] Inventors: Harold J. Vinegar; George L. Stegmeier; Eric P. de Rouffignac; Charles C. Chou, all of Houston, Tex.

[73] Assignee: Shell Oil Company, Houston, Tex.

[21] Appl. No.: 627,479

[22] Filed: Dec. 14, 1990

[51] Int. Cl.$^5$ .............................................. E02D 3/11
[52] U.S. Cl. .................................. 405/128; 210/747; 405/258
[58] Field of Search ............... 405/128, 129, 258, 303, 405/131; 210/747, 751; 166/266, 267

[56] References Cited

U.S. PATENT DOCUMENTS

| | | | |
|---|---|---|---|
| Re. 30,738 | 9/1981 | Bridges et al. | 166/248 |
| 632,388 | 9/1899 | Whitehead | 405/131 |
| 2,229,235 | 1/1941 | Adams | 405/131 |
| 3,181,613 | 5/1965 | Krueger | 166/300 |
| 3,293,863 | 12/1966 | Cox et al. | 405/131 |
| 3,564,862 | 2/1971 | Hashemi et al. | 405/131 X |
| 4,140,179 | 2/1979 | Kasevich et al. | 166/248 |
| 4,376,598 | 3/1983 | Brouns et al. | 405/258 |
| 4,435,292 | 3/1984 | Kirk et al. | 210/747 |
| 4,670,634 | 6/1987 | Bridges et al. | 219/10.41 |
| 4,671,701 | 6/1987 | Elliott | 405/131 |
| 4,834,194 | 5/1989 | Manchak | 405/128 X |
| 4,842,448 | 6/1989 | Koerner et al. | 405/128 |
| 4,957,393 | 9/1990 | Buelt et al. | 405/128 |
| 4,982,788 | 1/1991 | Donnelly | 405/258 X |
| 4,984,594 | 1/1991 | Vinegar et al. | 405/129 X |
| 5,004,373 | 4/1991 | Carter | 405/258 X |
| 5,011,329 | 4/1991 | Nelson et al. | 405/128 |

FOREIGN PATENT DOCUMENTS

953119  8/1974  Canada ............................. 405/131

Primary Examiner—Dennis L. Taylor

[57] ABSTRACT

An in situ method for removal of contaminants from soil imposes a vacuum on the soil through perforated heater wells that are positioned in the soil. The heater wells heat the soil to elevated temperatures by thermal conduction. The heater wells are permeable to vapors which emanate from the soil when heated and which are drawn toward the heater wells by the imposed vacuum. An impermeable flexible sheeting on the soil surface reduces the amount of air that is being pulled into the heater well from the atmosphere. A thermal insulator covers the soil surface and reduces heat losses from the soil surface. The heater wells are connected to a vacuum manifold for collection of vapors. A heat front moves away from the heater wells through the soil by thermal conduction, and the superposition of heat from a plurality of heater wells results in a more uniform temperature rise throughout the well pattern. Soil contaminants are removed by vaporization, in situ thermal decomposition, oxidation, combustion, and by steam distillation. Both the presence of water vapor and the low pressure results in vaporization of the contaminants at temperatures well below their normal boiling points. Moreover, the heater wells and the nearby soil are extremely hot and most contaminants drawn into the wells will decompose with a residence time of the order of seconds. The heater well can also be packed with a catalyst that accelerates high temperature decomposition into simpler molecules. Water vapor and remaining contaminants may be incinerated in line or may be collected in a cold trap upstream from the vacuum pump.

11 Claims, 5 Drawing Sheets

|  | TRIANGLE (13.3 FT) | SQUARE (12 FT) |
|---|---|---|
| TIME (DAYS TO 250°C) | 75 | 75 |
| WELL DENSITY | 154 $FT^2$/HTR | 144 $FT^2$/HTR |
| # HEATERS (100 x 100) | 65 | 70 |
| TONS/INJECTOR | 252 | 234 |
| HEATING COST/TON | $6 | $6 |
| OPERATING COST/TON | $10 | $11 |
| CAPITAL COST/TON | $20 | $22 |
| TOTAL COST/TON | $36 | $39 |

CONTAMINANT
△ DODECANE
○ HEXADECANE
□ AROCLOR 1242
▽ AROCLOR 1554
◇ AROCLOR 1260
○ DIELDRIN

VACUUM METHOD FOR REMOVING SOIL CONTAMINANTS UTILIZING THERMAL CONDUCTION HEATING

FIELD OF THE INVENTION

The invention is directed to the in situ remediation of soil from a pattern of heater wells.

BACKGROUND OF THE INVENTION

The contamination of surface and near-surface soils has become a matter of great concern in many locations in the United States and other countries. Increasingly, the public has become aware of spills and landfills of toxic and carcinogenic or radioactive materials in the soil. If left in place, many of these contaminants will find their way into aquifers, air, or into the food supply, and could become public health hazards.

There are many proposed methods for removal of surface contaminants, such as excavation followed by incineration, in situ vitrification, biological treatment, chemical additives for deactivation, radiofrequency heating, etc. Although successful in some applications, these methods can be very expensive (hundreds of dollars per ton) and are not practical if many tons of soil must be treated.

Hazardous waste materials have been improperly deposited in thousands of sites all over the United States and, indeed, all over the world. Uncontrolled landfills have been used as convenient, but inadequate, disposal sites for industrially generated wastes while other sites have been contaminated by accidental spills of hazardous materials. There are many sites where hazardous materials found at these sites are stable, do not undergo environmental degradation at reasonably fast rates, have high boiling points, are considered toxic at very low concentration levels, and bio-accumulate in various species of the food chain at concentrations higher than that found in the environment.

Complete reclamation or isolation of such sites is preferred but the cost associated with site remediation by available methods has been considered prohibitive. The treatment of contaminated soil from such sites in an incinerator has not been a practical solution for several reasons including the high cost of excavation and incineration, shortage of incineration capacity, inadequate methods and capacity for ash disposal from the incinerators, and the hazards and risks associated with site disturbance and transportation. The treatment of uncontrolled landfills and spills would benefit from an in situ process that eliminates or alleviates these disadvantages and risks.

In situ heating of earth formations by high-frequency displacement currents (dielectric heating) is well known, particularly in the production of petroleum products such as shale oil. Alternatively, heating by conduction currents at relatively low frequencies is also possible, but such heating is limited to earth that remains conductive, generally requiring the presence of water and, hence, operating at relatively low temperatures below the boiling point of water or requiring maintenance of pressure. Conduction heating at very high temperatures for the immobilization of radioactive components in soil is shown in Brouns et al, U.S. Pat. No. 4,376,598, where conductive material was added to the soil to assure conduction, and the soil was heated to vitrification at temperatures as high as 1500° C., whereat radioactive contaminants are fused with the silicates in the soil to form a glass or similar product which, upon cooling, forms a stable mass.

In situ heating of earth formations with RF energy for hydrocarbon production is shown in Bridges et al, U.S. Pat. No. RE 30,738 and Kasevich et al, U.S. Pat. No. 4,140,179. The former discloses the use of RF energy from a "tri-plate" line buried in the earth to heat a block of earth formations uniformly by displacement currents, leading to dielectric heating. The latter discloses radiating RF energy into the earth. In U.S. Pat. No. 4,670,634 a portion of the earth near the surface is decontaminated by selective heating with RF energy from a transmission line array to which the RF energy is bound. That is, there is substantially no radiation from the bound-wave fringing-field transmission line excitor.

Assignee's co-pending application Ser. No. 444,574 filed Nov. 20, 1989, now U.S. Pat. No. 4,973,811 utilizes a different coupling scheme, called "eddy current" "inductive" coupling which makes use of the magnetic field established rather than the electric fields as disclosed in the prior art RF systems above-described. A current generator is used to drive a transmission line which is shorted at the opposite ends. This method is much better suited to heating highly conductive soils than the fringe field method.

U.S. Pat. No. 4,842,448 issued to Robert M. Koerner et al on Jun. 27, 1989 discloses a method and apparatus for in situ removal of contaminants from soil comprising a barrier having a permeable inner layer and an impermeable outer layer overlying the contaminated soil and a vacuum system for reducing pressure under the barrier and withdrawing contaminants from the contaminated soil.

Assignee's co-pending application Ser. No. 427,418 filed Oct. 27, 1989, now U.S. Pat. No. 4,984,594 discloses an in situ method for remediation and decontamination of surface and near-surface soils by evacuating the soil under a flexible sheet, which is impermeable to gases, and heating the soil surface with a relatively flat electric surface heater, which is permeable to gases.

In assignee's co-pending application Ser. No. 833,569 filed Feb. 7, 1992, which is a continuation of Ser. No. 427,427 filed Oct. 27, 1989, now abandoned, an in situ method is disclosed for remediation and decontamination of surface and near-surface soils by electrically heating the soil through electrodes operated at power line frequencies of about 60 Hz. The electrodes are implanted substantially vertically in the soil in a line pattern which allows substantially uniform electrical heating in the region between rows of electrodes. The depth of electrode insertion is substantially equal to the depth of the contamination, but could be deeper or shallower. The process is particularly applicable to soils contaminated at depths of up to about 30 meters. The electrodes are hollow and perforated below the surface to allow application of a vacuum to the soil through the electrodes. The electrodes are also equipped with provision for electrical connection and vacuum line connection, and also with the capability to be sealed to a barrier that is impermeable to gases, such as a flexible sheet.

U.S. Pat. No. 4,435,292 discloses a portable system which can be installed at an area where a contaminating spill has occurred. After the area of the contamination has been determined, perforated pipes are inserted into the ground. Some of the wells are pressurized and others are evacuated simultaneously so as to increase the transfer of a flushing fluid through the soil thereby accelerating the decontamination process and preventing migration of the contaminant into other areas. Since the system is a closed system, the contaminated liquid taken off in the evacuation side of the circulating system is bypassed in whole or in part to a portable processing plant wherein the contaminants are removed.

And finally, in Assignee's co-pending application Ser. No. 559,771 filed Jul. 30, 1990, now U.S. Pat. No. 5,076,727 moist warm air from a vapor treatment system is injected into wells which are screened (perforated) only at the contaminated depth forcing vapor flow only through the contaminated region. Between the injection wells is an extraction well which is also screened only at the contaminated depth. A vacuum is drawn on the extraction well through the contaminated soil, thereby entraining some of the contaminants. The contaminated, flushing vapor is then treated and recycled. A microwave/radio frequency (MW/RF) heating system heats the earth's surface and the contaminated soil, thereby enhancing volatilization of the contaminants and their removal via the vapor flushing system. By screening the wells only through the contaminated zone and maintaining the contaminated soil zone in a moist state, the entire energy of the system is focussed on the contaminated region.

Most of the existing methods for decontamination are cost effective only for the near surface soil, of the order of several feet. For deeper contamination, particularly in localized regions, the costs of soil removal rise dramatically.

What is desired, therefore, is a method for effectively removing contamination which avoids the excavation of large quantities of soil; which can be utilized at considerable depths up to many tens or hundreds of feet; which can remove contaminants with boiling points substantially greater than water (up to hundreds of degrees C.); which is generally applicable to a wide range of contaminants (even those with low vapor pressure at room temperature); which can reduce the level of contamination down to extremely low levels of the order of parts per billion; and which is rapid and inexpensive to operate in a wide variety of soils and surface conditions. These and other advantages of this invention are disclosed below.

SUMMARY OF THE INVENTION

An in situ method for removal of contaminants from soil imposes a vacuum on the soil through perforated heater wells that are positioned in the soil. The heater wells heat the soil to elevated temperatures by thermal conduction. The heater wells are permeable to vapors which emanate from the soil when heated and which are drawn towards the heater wells by the imposed vacuum. An impermeable flexible sheeting on the soil surface reduces the amount of air that is being pulled into the heater well from the atmosphere. A thermal insulator covers the soil surface and reduces heat losses from the soil surface. The heater wells are connected to a vacuum manifold for collection of vapors. A heat front moves away from the heater wells through the soil by thermal conduction, and the superposition of heat from a plurality of heater wells results in a more uniform temperature rise throughout the well pattern. Soil contaminants are removed by vaporization, in situ thermal decomposition, oxidation, combustion, and by steam distillation. Both the presence of water vapor and the low pressure results in vaporization of the contaminants at temperatures well below their normal boiling points. Moreover, the heater wells and the nearby soil are extremely hot and most contaminants drawn into the wells will decompose with a residence time of the order of seconds. The heater well can also be packed with a catalyst that accelerates high temperature decomposition into simpler molecules. Water vapor and remaining contaminants may be incinerated in line or may be collected in a cold trap upstream from the vacuum pump.

DETAILED DESCRIPTION OF PREFERRED EMBODIMENTS

Figure 1:
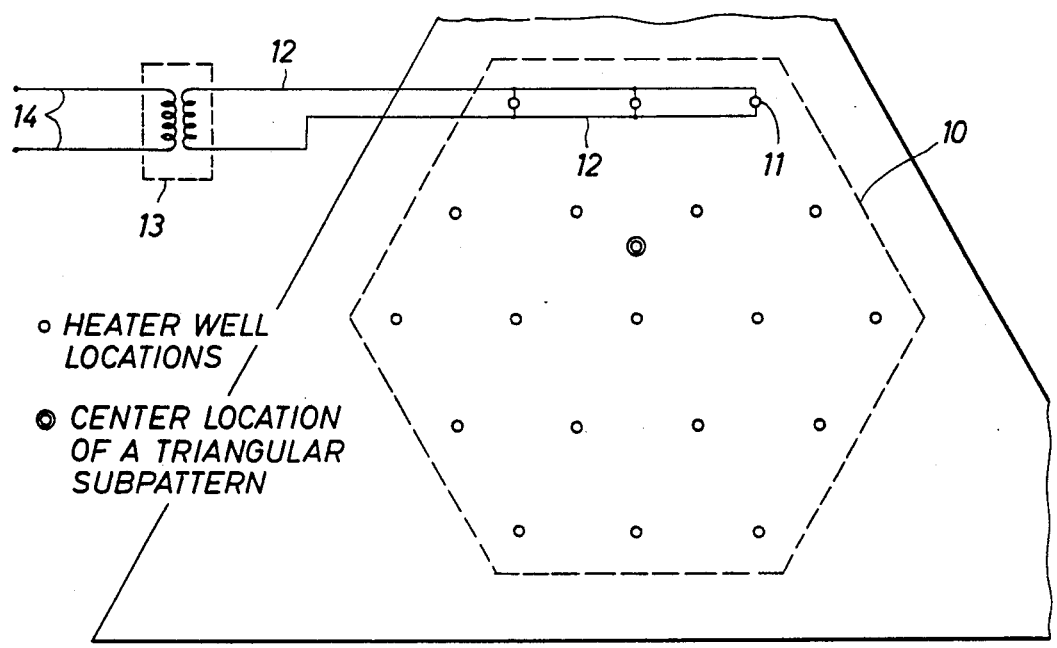
FIG. 1 shows an areal drawing of a triangular pattern of heating wells according to the present invention.

An in situ method is disclosed for vaporization, thermal decomposition and steam distillation of contaminants from soil by evacuating the soil through a pattern of heater wells. The heater wells are perforated and also serve as vacuum pumping wells. Contaminants are volatilized and drawn towards the heater wells where they are decomposed into simpler molecules and produced.

The heater wells may be heated electrically or by other methods such as a gas combustion heater. In the preferred embodiment, however, the heater wells are heated electrically. The heater wells may be constructed from commercial tubular electrical heating elements placed inside a larger perforated metal casing. The casing may be made, for example, from Inconel 601, stainless steel 310 or 314, Incoloy 800 HT, alloys 35-19 and 80-20CB, molybdenum or tungsten. The heaters may be commercial nichrome/magnesium oxide tubular heaters with Inconel 601 sheaths operated at temperatures up to about 1250° C. Alternatively, silicon carbide or lanthanum chromate "glow-bar" heater elements, carbon electrodes, or tungsten/quartz heaters could be used for still higher temperatures. Electrical power for the heaters is supplied at power line frequencies near 60 Hz. The well casing is permeable to vapors that emanate from the soil when heated. The heater well may also be packed with a catalyst such as alumina or other known degradative catalysts which will accelerate the decomposition of the contaminants drawn into the high temperature well. The heater well is equipped with provision for electrical connections to supply electrical power to the heater and also with a vacuum pumping flange on top of the well. Alternatively, the heaters may be placed directly in uncased holes in the soil and packed with high permeability sand to improve thermal contact with the soil.

The heater well casings are placed in holes drilled in the soil to depths that extend slightly below the contaminated zone. Alternatively, the well casings may be driven into the soil by conventional pile driving techniques such as hammers or ultrasonic devices. The heater wells are not necessarily cemented in and therefore can be removed and reused after the process is completed and the soil cools down. Depending on the geometry of the contaminated zone, the heater wells need not be vertical but could be directionally drilled horizontally, or the heater well could consist of a combination of vertical and horizontal sections. Alternatively, the heater wells could be straight sections drilled at an inclined angle.

The heater wells are arranged in a pattern so as to achieve the most uniform heating throughout the pattern. A regular pattern of heater wells can be used, such as triangular, square, rectangular, hexagonal etc., chosen to substantially cover the contaminated area. Triangular patterns are preferred since they provide the best thermal efficiency and, in practice, are easy to locate on the soil surface. The temperature in the soil is raised by applying heat from the heater wells. A thermal front moves away from the wells into the soil by thermal conduction, thereby vaporizing water and contaminants in the near surface soil. The superposition of the heat flow from all the heater wells results in a more uniform rise in temperature within the pattern. The spacing and number of heater wells is determined by the time desired to complete the process and by economic considerations. For example, a triangular heater well pattern with 12-ft spacing between heater wells maintained at 1250° C. will raise the temperature above 250° C. everywhere in the pattern in about 60 days for typical soil conditions.

The vacuum pumping lines from the heater wells are connected together at the surface to a vacuum pumping manifold and thence to a vacuum pump. At the surface, provision is made for trapping contaminants, for example, by wet scrubbers, activated carbon columns, chemical absorbents or for in-line destruction by catalytic oxidation or incineration.

An impermeable flexible sheet can be placed on the soil surface which can seal to the soil surface as a vacuum is pulled through the heater wells. Mats which are good thermal insulators are placed above or below the impermeable flexible sheet. The thermal insulation reduces heat losses through the soil surface, resulting in a more energy efficient process.

According to the teachings of this invention, a vacuum is applied through a manifold connecting to the heater wells. The soil surface is sealed by the impermeable flexible sheeting as atmospheric pressure pushes the flexible sheeting against the soil surface. Creating a vacuum below the flexible sheeting may cause the flexible sheeting to be sucked to the ground surface but in any case will reduce the amount of air that is being pulled into the vacuum well from the atmosphere. Thus, substantially only air, soil moisture, and contaminants in the soil will be evacuated by the pump. By pulling moisture and contaminants toward the heater wells and towards the soil surface, the risk of spreading the surface contamination is dramatically reduced.

Before applying heat to raise the soil temperature, a vacuum is created in the soil through the heater wells. The vacuum is maintained throughout the period of heating and for a sufficient time after heating to avoid contaminant losses or dispersion. The vacuum will lower the vapor pressure of the water in the soil and cause boiling to occur at a lower temperature than the normal boiling point at atmospheric pressure. At the same time, the high boiling point contaminants will be removed by steam distillation in the presence of water vapor at a temperature well below the normal boiling point of the contaminants. This will occur for all contaminants that are nearly immiscible in water, since the boiling point of the mixture of two immiscible fluids will always be less than the boiling point of either component by itself.

Contaminants whose boiling points are well beyond 300° C. can thus be removed by this process. Unlike other decontamination processes that require flow of electrical current or radiofrequency displacement currents in the soil, this process can be applied in soils that have low in situ moisture content. Moreover, the decontamination process can be continued to temperatures well above the boiling point of water. In addition, the heating achieved by thermal conduction is more uniform than that achieved by flowing current in the ground because there is little variation in the thermal conductivity and thermal diffusivity of soils whereas there are orders of magnitude variation in the electrical properties. Thus, all decontamination methods that require electrical current flow through the soil can leave relatively cold zones behind where the contaminants may not be removed. Yet another advantage of this invention is the efficient use of electrical power because no losses are associated with generating radiofrequencies or microwaves, and much more thermal energy can be concentrated in the contaminated zone.

Inexpensive 60 Hz power from a power line transformer can be used for thermal conduction heating of the soil, rather than other methods that rely on radiofrequency power with its attendant high costs and inefficiencies. Since the thermal conductivity of the soil is easily measured, the heating process can be tailored to use the minimum temperature required for volatilization of the contaminants. Since the thermal conductivity of the soil will change very little during the process, the heating process requires little attention from the operators, unlike electrical and radiofrequency methods where the electrical properties can change by orders of magnitude once the free water has been drive off the soil.

The water vapor and contaminants can be collected in a cold trap or liquid-filled condenser located near the well head. The cold trap, in turn, is connected to the vacuum pump. The water and contaminant liquids can be separated on the basis of density in a separator, while the gases can be incinerated on site.

The handling of hazardous contaminant vapors at the surface is greatly reduced by this invention because the contaminants are decomposed in passing through the heater wells and the high temperature catalyst used therein. For organochlorine pesticides, for example, the decomposition products are typically water, carbon dioxide, and hydrogen chloride. With these simple decomposition products, a wet scrubber and a polishing activated carbon trap are often sufficient at the surface. Alternatively, the contaminants can be trapped and concentrated on molecular sieve material, in a chemical absorbent, or in a low temperature condensate trap. Thereafter the concentrated contaminants can be incinerated or otherwise disposed of at a distant site. Alternatively, any contaminants that survive passage through the heating wells can be catalytically oxidized, transformed or incinerated in line before or after the vacuum pump.

In an additional method of practicing this invention, once the soil has been evacuated and is at elevated temperatures, various gases and liquids can be injected through the heater wells, through other injection wells or through openings in the impermeable flexible sheeting. Thus, for example, oxygen, hydrogen peroxide, or other reactants could be injected to more completely remove or decompose the contaminants by chemical reaction at elevated temperature. In some cases, the pH of the soil can be adjusted to improve reactions. This could be done in conjunction with additional heating to accelerate the reaction kinetics for the decomposition of the contaminant.

The process may also consist of repetitive cycles of heating, adding moisture to the soil, heating, adding moisture, etc., to take advantage of steam distillation in reducing contaminants to extremely low concentrations.

Still another practice of this invention could embody other sequences of withdrawal of liquids prior to electrical heating. For example, liquid water could be removed by evacuation through the heater wells, thereby desaturating the soil and reducing the electrical power required for vaporization of the moisture.

The contaminants that can be removed by this process consist of, but are not limited to the following: hydrocarbons; pesticides; chlorinated hydrocarbons such as PCB's and dioxins; chemical warfare products such as nerve gases and their derivatives; radioactive wastes such as tritium and tritiated water; heavy metal contaminants such as mercury, arsenic, etc. The process could also be use for sterilization of soil and the destruction of undesirable biological activity. The invention is in general applicable to any contaminant which has a vapor phase at elevated temperatures and reduced pressures, and to contaminants which decompose to gaseous products at elevated temperatures.

Referring now to FIG. 1, there is shown an areal drawing of the heating section 10 according to the present invention. The size of the heated section can be, for example, of the order of 50–100 feet on a side but could be greater or smaller than this size. As shown in FIG. 1 the heater wells 11 are vertical and arranged in a triangular pattern; however other patterns could also be employed, such as a square or hexagonal pattern, depending on the shape of the area to be remediated. The triangular pattern gives the fastest temperature response for a given areal density of heater wells. A square pattern has some advantages in requiring less repositioning of the drilling rig and simplification of surface facilities.

The heating section is energized from a low-frequency source, e.g. 60 Hz by means of a common bus line 12 which may connect, for example, to a transformer 13, a power conditioner (not shown), a phase-angle fired SCR power supply, or directly to the power line 14. Surface facilities (not shown) are also provided for monitoring current, voltage, and power to the heater wells.

Figure 2:
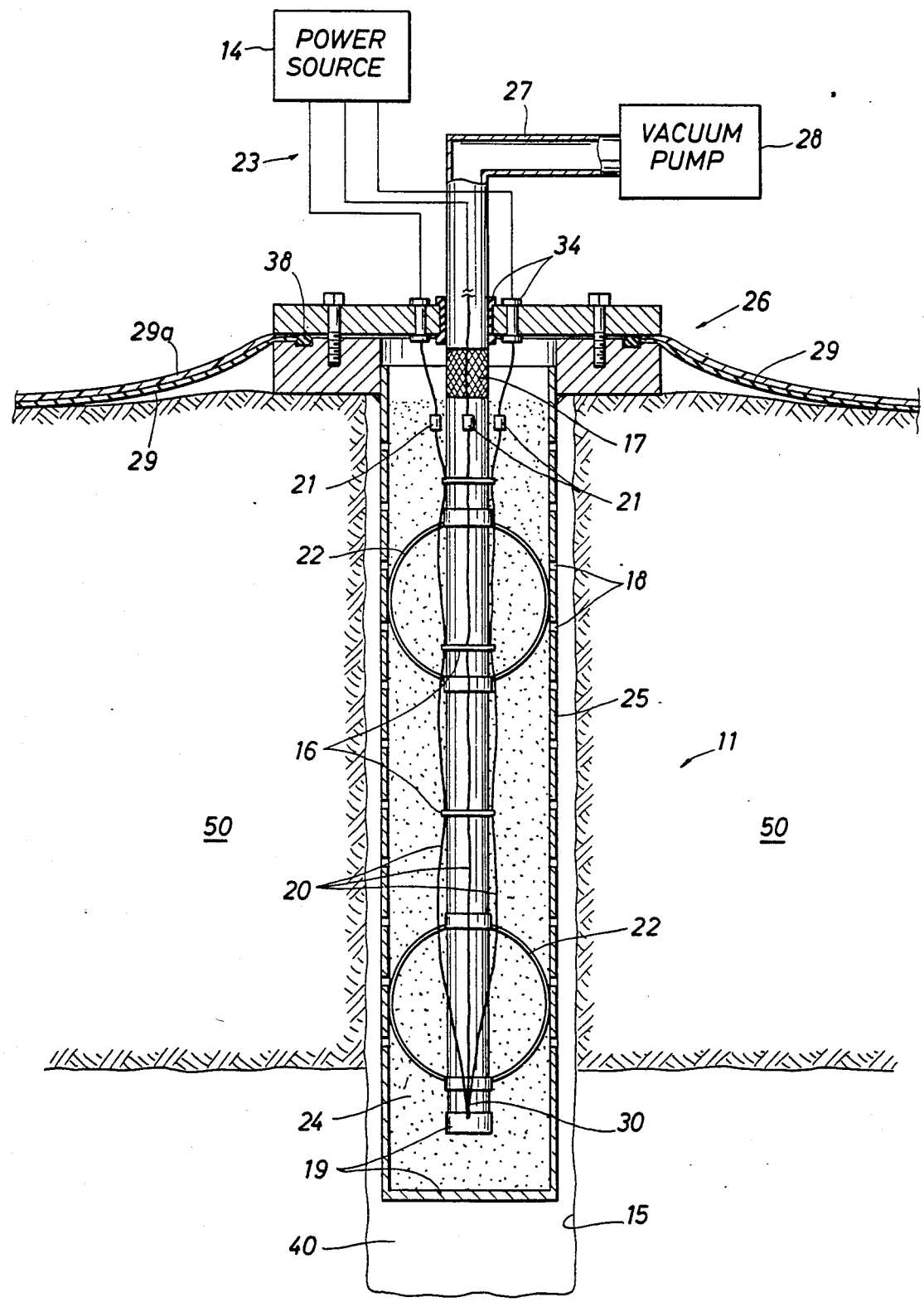
FIG. 2 shows a cross sectional view through a heating well.

Referring now to FIG. 2, there is shown a side view through a heating well. The heating well 11 is positioned into a borehole 15 and consists of the electrical heaters 20, including electrical connections 21 to cables 23, spacers or centralizers 22, catalyst bed 24, perforated casing 25, welded flange 26, vacuum connection 27 to a vacuum pump 28, and an impermeable sheet 29 and thermal insulation 29a. The electrical heaters 20 may be commercial tubular heaters constructed from a resistive metal alloy, such as nichrome, which can tolerate very high temperatures (of the order of 1250° C.). Nichrome/magnesium oxide sheathed tubular heaters with an Inconel 601 sheath, such as those made by Chromalox Corporation, are suitable and readily available. Stainless steel 310, Incoloy 800 HT or Inconel 601 sheaths may be considered for high temperature corrosion resistance. Depending on the heater resistivity, several heaters could be connected together either in series, in parallel, or in series/parallel combinations. Three heaters in parallel in the same well having a "Y" electrical common 30 are shown in FIG. 2. The vacuum line 27 may be, for example, 1.25" steel tubing and serves to support the heaters 20 which are secured to the line 27 by steel banding straps 16. The vacuum line 27 is screened or perforated at 17, i.e. the top of the well, to remove gases and vapors from the well.

Another type of electrical heater that could be employed are "glow bars" such as those manufactured by Carborundum Corporation, which are constructed of silicon carbide and capable of temperatures of 1500° C., or other semiconducting material such as lanthanum chromate capable of temperatures above 1500° C. Still another type of electrical heater that could be employed is a halogen-quartz element using a tungsten wire inside a sealed quartz tube filled with halogen gas. Yet another type of electrical heater could be a carbon electrode maintained in an oxygen-free gas enclosure.

The heater well 11 extends through and somewhat past the zone of contaminated soil 50. Heaters 20 may or may not extend all the way to the surface. Because of heat losses below the heater, the heater well should extend some distance below the zone of contaminated soil 50 to ensure a uniform vertical temperature profile over the contaminated zone 50. A space 40 is provided between the bottom of the borehole 15 and the bottom of the heater well 11 to allow for expansion.

A conducting cable 23 connects the heaters 20 with the power source 14. The cable 23 should be insulated and should be constructed of a high temperature conductor such as nickel or copper where the cable 23 connects to the heaters 20. A mineral insulated (i.e., magnesium oxide insulated) copper cable is suitable. The cables 23 and vacuum line 27 can be brought through sealed holes 34 in the welded flange 26. Thermocouples or other temperature monitoring means (not shown) may be placed in the heater well at various locations to aid in monitoring and controlling the temperatures.

The well casing 25 may be composed of steel tubing, such as 2⅞" standard oil field casing, if the temperatures used do not exceed about 800° C. At temperatures above 800° C., stainless steel 310 and 314, alloys 35-19 and 80-20CB, Inconel 601, Incoloy 800HT, molybdenum, or tungsten alloy casing should be used in place of steel. The casing 25 could also be made from a ceramic such as silicon carbide, silicon nitride, or alumina. The casing 25 and vacuum line 27 are sealed at the bottom with a cap or point 19 and the sides of the casing 25 have perforations 18 to allow fluid flow from the contaminated zone 50. The electrical heater elements are centered in the casing with a centralizer or spacer 22. The annular space between the heaters 20 and casing 25 is filled with a high temperature catalyst powder 24 such as alumina, silica, iron or zinc oxide, amorphous aluminosilicates, or special oxidation-reaction catalysts which will accelerate the decomposition of the contaminants into the simplest molecules. Alumina and iron oxide also have good thermal conductivity which minimizes the temperature drop from electrical heater 20 to casing 25. Depending on the contaminants, other catalysts may be used in place of, or in conjunction with, the alumina, silica or iron oxide.

The heater well 11 can be completely constructed before insertion into a borehole 15 drilled in the ground. This minimizes the field time required for installation. The holes in the ground can be drilled with an auger bit or by rotary air or mud drilling, depending on depth and soil conditions. Typically a 30-foot hole 3 to 4 inches in diameter can be augered into sandy soil in less than half an hour. Alternatively, the heater well 11 can simply be inserted into the ground without drilling a hole by using either pile driver or ultrasonic methods to embed the heater well into the soil.

Depending on the geometry of the contaminated zone, the heater wells need not be vertical but could be directionally drilled horizontally, or the heater well could consist of a combination of vertical and horizontal sections. Alternatively the heater wells could be straight sections drilled at an inclined angle. An example of where non-vertical heater wells would be used is in situations where the contaminated zone lies beneath a refinery or other plant, or beneath concrete or asphalt paving. In these situations it may be preferable to drill the heater wells from the periphery of the refinery using vertical and horizontal sections or to drill at an inclined angle so as not to disturb the surface facilities.

Another embodiment of the heater well avoids the use of the well casing 25. The borehole 15 is drilled, as described hereinabove, the electrical heaters 20 are inserted into the borehole which is then filled with the high temperature catalyst powder 24. The welded flange 26 is connected at the surface to a short section of open tubing which extends some depth into the hole. However, although this embodiment avoids the use of the well casing 25, it makes recovery of the electrical heaters 20 and catalyst powder 24 more difficult.

An impermeable flexible sheeting 29 can be used for sealing the surface of the soil to minimize air flow from the atmosphere into the heater well 11. The impermeable flexible sheeting may be constructed of silicone rubber, silicone rubber reinforced with fiberglass, fluorocarbon impregnated fiberglass, viton, viton reinforced with fiberglass, teflon, metallic or other high temperature material which is flexible yet impermeable to gas flow. The impermeable flexible sheeting 29 should be able to tolerate temperatures above the condensation temperature of the contaminants. It is sealed at the flange 26 by means such as O-ring 38. The required thickness of the impermeable flexible sheeting 29 will depend on operating conditions; however, typically the thickness will be in the range of about 10 to 125 mils although it could be less than or greater than this amount. The thicker the material the more durable; however, the thicker the material the greater the cost and the greater the weight involved in transporting the section. If the contamination is not near the surface and the heaters are positioned some distance below the surface, it may be possible to avoid high surface temperatures. In that case, any low temperature sealing sheet material such as PVC, polyethylene, etc., can be used.

The impermeable flexible sheeting may also have a layer of thermal insulation 29a placed above it to prevent heat losses from the soil and ensure that the vaporized contaminants do not condense under the sheeting. Alternatively, the thermal insulation 29a could be placed below the impermeable flexible sheeting 29. The thermal insulation 29a could be, for example, mineral or cotton wool, glass wool or fiberglass, polystyrene foam, or aluminized mylar ("superinsulation"). The thickness of this layer of thermal insulation 29a is selected to keep the impermeable flexible sheeting 29 at a temperature above the condensation temperature of the contaminant but low enough to prevent the impermeable flexible sheeting 29 from melting or degrading. Thermocouples or other temperature monitoring means may be placed on or under the impermeable flexible sheeting 29 to aid in controlling the temperature at the sheet.

Figure 3:
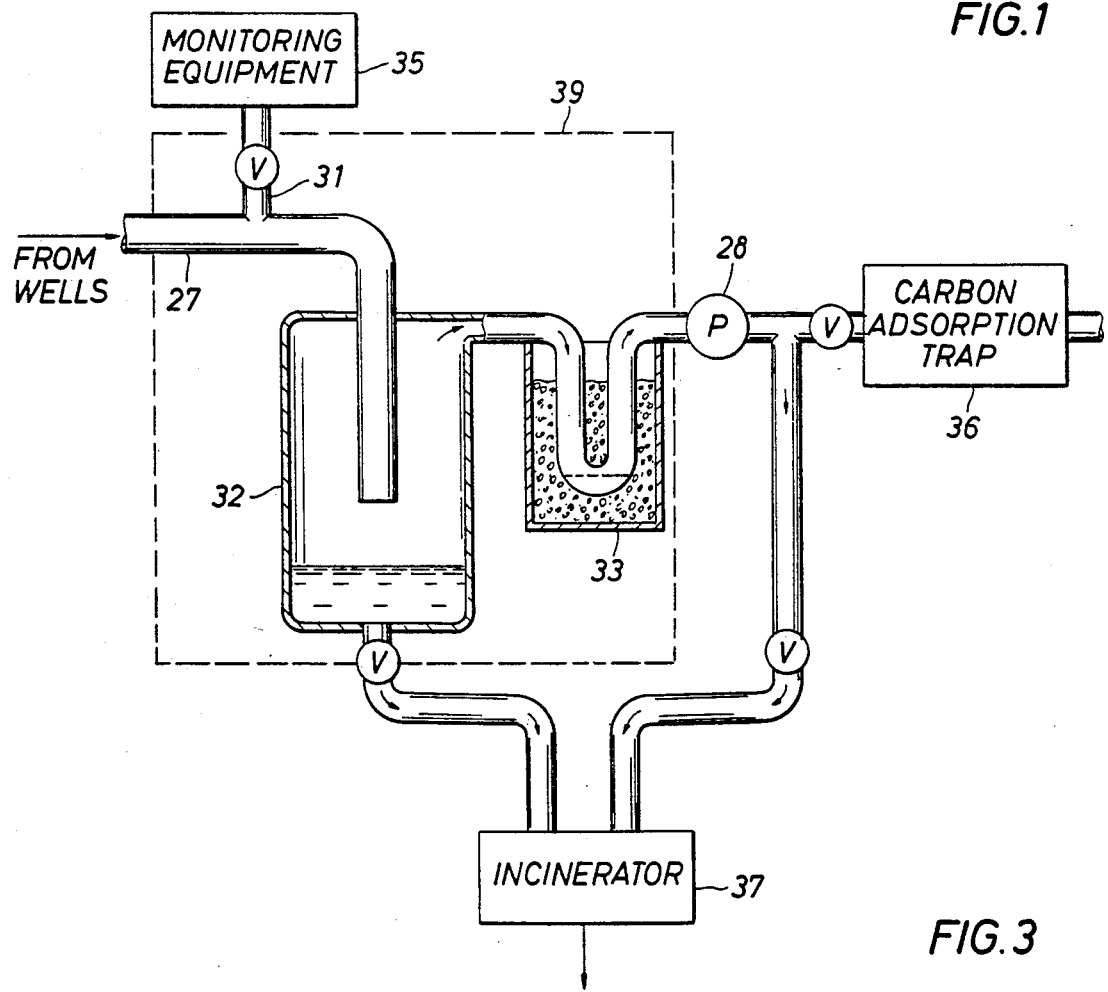
FIG. 3 shows the surface facilities including vacuum manifold, monitoring equipment, and the fluid and vapor collection and incineration facilities.

Referring now to FIG. 3, there is shown the fluid and vapor collection facilities. The pumping manifold 39 consists of a monitoring port 31, gas/liquid separator 32, and cold trap 33 located near the well head. The cold trap is connected into the vacuum pump 28. The monitoring port 31 is connected to an optional gas chromatograph, mass spectrometer, or both; or other monitoring equipment 35 which can be used to monitor the level of contaminants in the vapor. If radioactive contaminants are being removed, the monitoring equipment 35 could be a scintillation counter or Geiger counter. The vacuum pump 28 should be capable of pulling a vacuum appropriate for the particular combination of soil permeability and geometry of the wells and sheets, but possibly in the range 0.1 to 10 psi. The vacuum pump 28 could be, for example, a water-sealed vacuum pump which could eliminate the need for the cold trap 33. The water vapor and liquid contaminants are separated from the gas in a separator 32. The water and contaminant liquids can be separated on the basis of density in the separator, while the gases can be further treated on-site. Alternatively, the contaminants can be trapped and concentrated in a trap such as a wet scrubber, a chemical absorption column or an activated carbon trap 36 or in a low temperature trap and disposed of in an incinerator 37 or catalytic oxidizer on-site. Trapped and concentrated contaminants can be further treated off-site by a certified disposal company.

As the vaporized contaminants are drawn toward the heater wells, they pass through the extremely high temperature zone at the heaters 20 and catalyst 24 and through the soil immediately surrounding the casing where the temperatures are in excess of 1000° C. At these temperatures the carbon-hydrogen and carbon-chlorine bonds are rapidly broken. For example, the residence time for the carbon-chlorine bond is about 2 seconds at 1000° C. and shorter at higher temperatures. Thus, the contaminants will be dissociated in and around the heater wells 11 and will recombine to make the simpler, more volatile molecules. For organochlorine pesticides, the decomposition products in the presence of excess air are typically water vapor, carbon dioxide, and hydrogen chloride. These simple products can be handled much more easily at the surface facilities compared with handling the toxic material itself.

Figure 4:
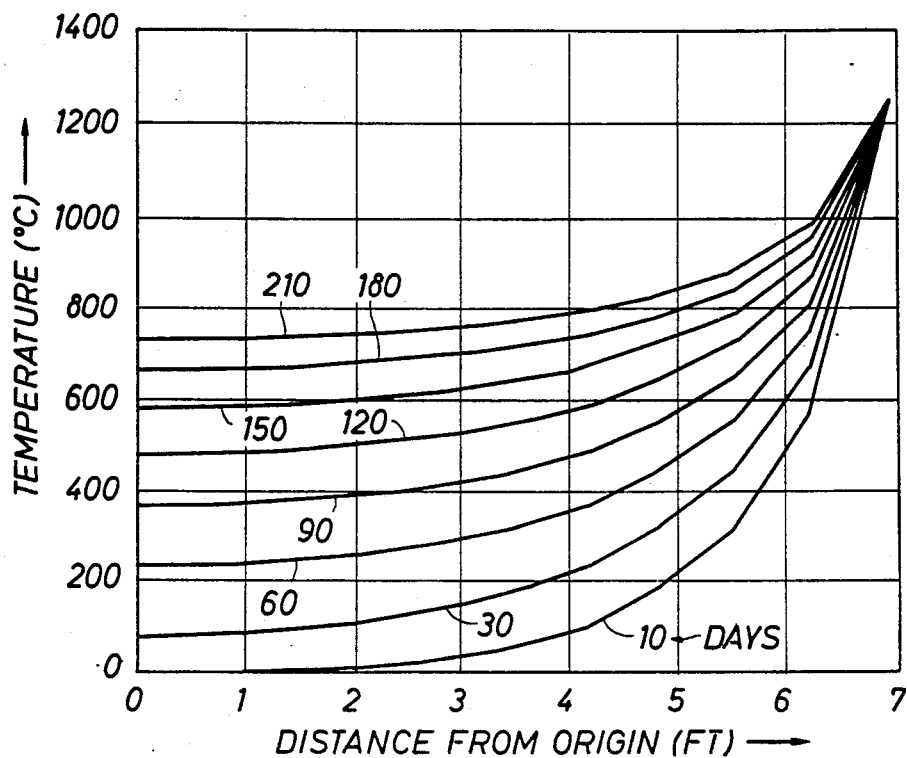
FIG. 4 shows the lateral temperature profile from a heating well toward the center of the triangular pattern in FIG. 1 as a function of time for a 12-foot triangular spacing and at a depth of 15 feet.

Referring now to FIG. 4, there is shown a temperature profile from a heating well toward the center of the 12-foot triangular pattern in FIG. 1 as a function of time. The heaters are assumed to extend from the surface to 36 feet deep in a semi-infinite medium, the casing of the heater well is $2\frac{7}{8}''$, and the casing is maintained at 1250° C. The temperature shown is almost midway down the heater at 15 feet. The soil density is 1.75 gm/cc, specific heat is 0.24 cal/gm °C., thermal conductivity is 0.0014 cal/°C. sec cm, and the thermal diffusivity is 0.0033 cm$^2$/sec. The time required to heat the center of the pattern to a minimum temperature of 250° C. is 60 days. Except in the immediate vicinity of the heater well, the temperatures are quite uniform areally and therefore little heat is wasted in overheating sections of the ground. The uniformity of the heating is a major advantage of this invention.

Figure 5:
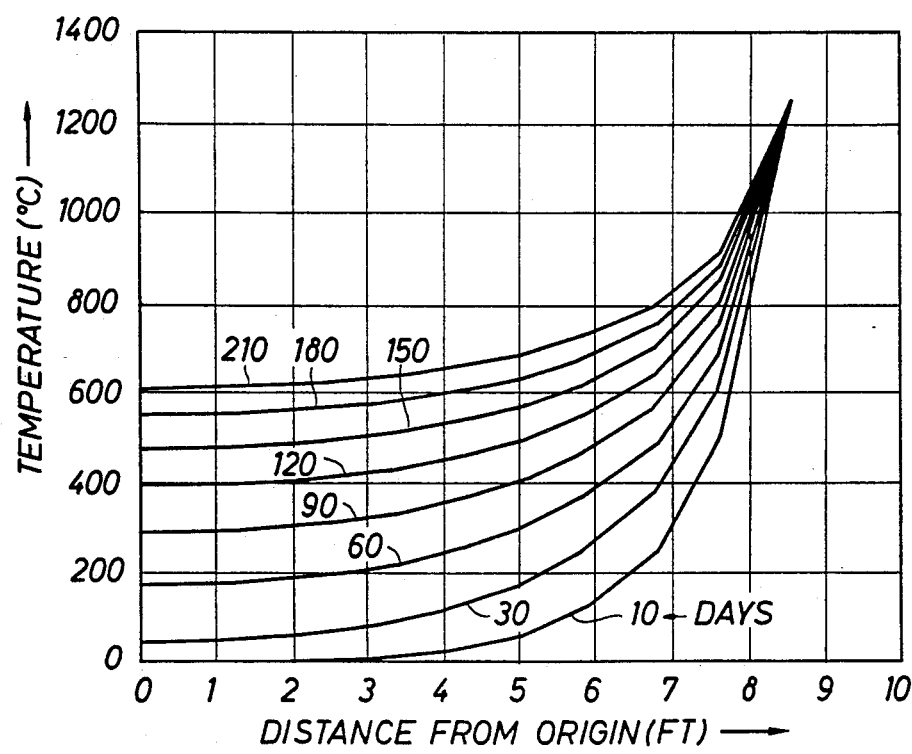
FIG. 5 shows the lateral temperature profile from a heating well toward the center of a square pattern as a function of time for a 12-foot square spacing and at a depth of 15 feet.

Referring now to FIG. 5, there is shown a similar result with a 12-foot square spacing. The time required to heat the center of the pattern to a minimum temperature of 250° C. is 75 days, which is longer than for the 12-foot triangular pattern. The triangular patterns can be arranged to conform more closely to circular or oval-shaped contaminated areas; however the square pattern conforms more closely to property lines. The square spacing also has an advantage in easier logistics for drilling the wells and laying out electrical and pumping lines.

Figure 6:
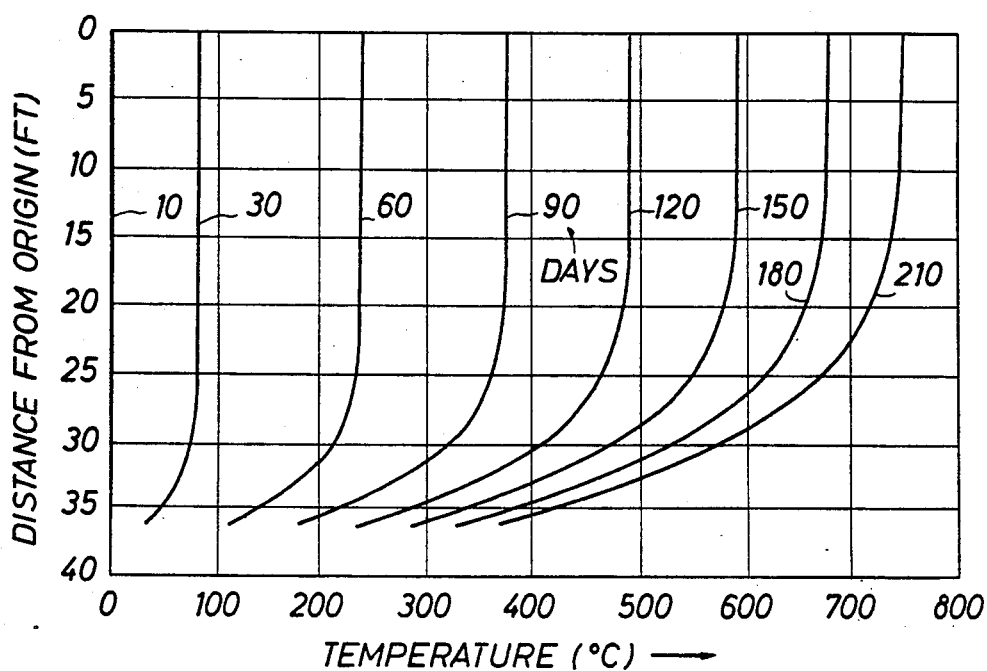
FIG. 6 shows the vertical temperature profile as a function of time at the center of a triangular pattern for a 12-foot triangular spacing.

Referring now to FIG. 6, there is shown the vertical temperature profile as a function of time at the center of a triangular pattern for a 12-foot triangular spacing. The heater is 36 feet long and the soil surface is assumed to be covered by a perfect thermal insulator. The uniform vertical distribution is apparent down to a depth of about 30 feet. Below 30 feet, the temperature falls off due to heat losses below the heaters.

Figure 7:
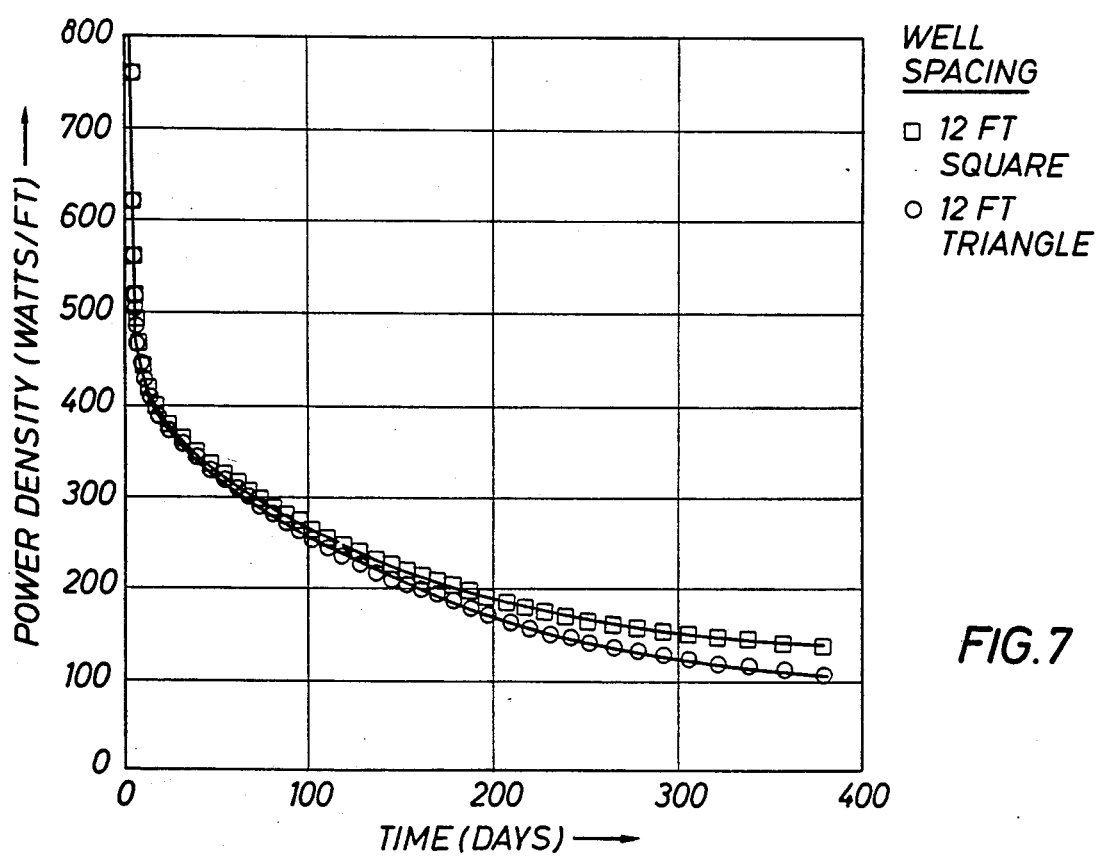
FIG. 7 shows the level of input power required to maintain the surface of the casing at 1250° C. as a function of time for the 12-foot triangular pattern and the 12-foot square pattern.

Referring now to FIG. 7, there is shown the level of input power required to maintain the surface of the casing at 1250° C. as a function of time for 12-foot triangular spacing and 12-foot square spacing. The input power must be reduced with time as the soil heats to keep the casing at 1250° C.

Figures 8, 9:
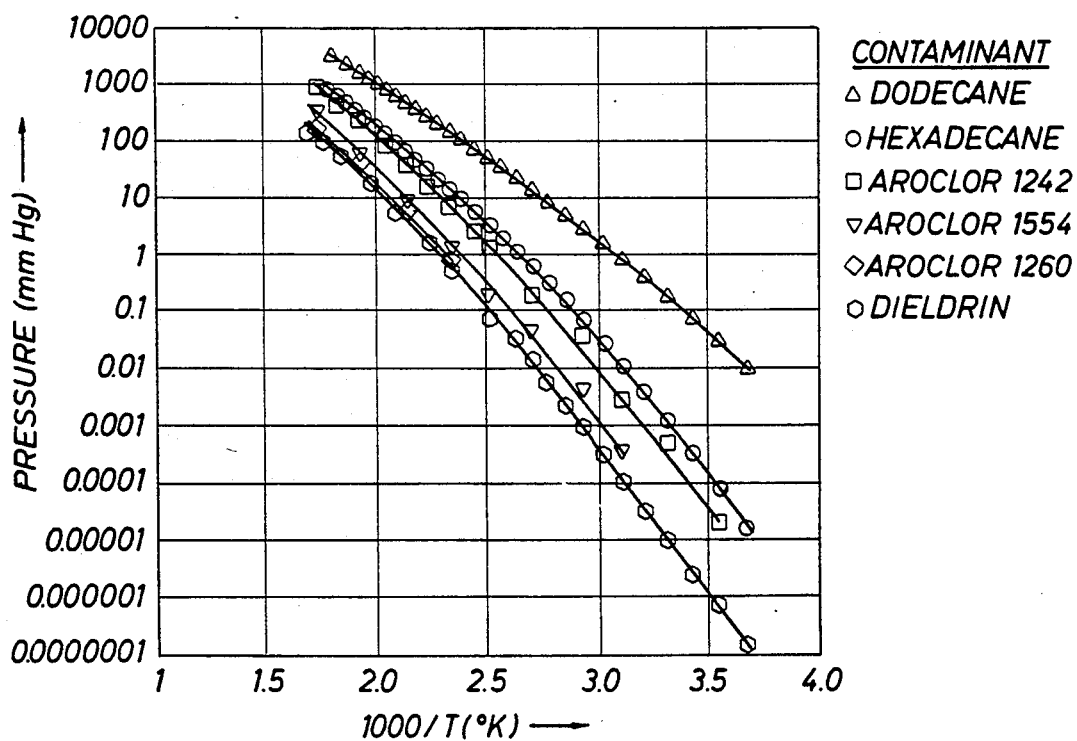
FIG. 8 is a table showing the economics of remediation by well pattern.
FIG. 9 shows vapor pressure curves versus temperature for various soil contaminants.

Referring now to FIG. 8, various process parameters are listed for the 12-foot square spacing and a 13.3-foot triangular spacing. These spacings result in heating to 250° C. at the center of the pattern in 75 days. The assumptions are: electrical costs of $0.055 per KWh; initial temperature of 20° C.; and 95% of the injected energy is contained in the region to be decontaminated. FIG. 8 shows that capital costs and other operating costs are substantially lower than other decontamination processes, which are typically in the range of $150-$500/ton. The cost per ton is less for the triangular well pattern than the square well pattern.

Referring now to FIG. 9, there is shown the vapor pressure curves of various contaminants found in some soils. The invention disclosed here is capable of removing all of these contaminants by operating at appropriate temperatures above the vaporization temperature of the particular contaminant. Thus, the process is believed applicable to hydrocarbons, pesticides, chlorinated hydrocarbons such as PCB's (polychloro biphenyls), dioxins or other halogenated hydrocarbons such as DBCP (1,2 dibromo-3-chloropropane), TCE (trichloroethylene), and PCP (pentachlorophenol), chemical warfare products such as nerve gases, mustard gases and their derivatives, radioactive contaminants such as tritium and tritiated water, heavy metals contamination such as mercury and arsenic, and many others. The process could also be used for the sterilization of soil and destruction of undesirable biological activity. The invention is generally applicable to any contaminant that has a vapor phase at elevated temperatures and reduced pressures and to those which decompose at elevated temperatures to gaseous products.

Before applying electrical heat to raise the soil temperature, a vacuum is created in the soil through the heater wells 11 and the flexible sheet 29. The vacuum will lower the vapor pressure of the water in the soil and cause boiling to occur at a lower temperature than the normal boiling point at atmospheric pressure. At the same time, the high boiling point contaminants will be removed by steam distillation in the presence of water vapor at a temperature well below the normal boiling point of the contaminants. This will occur for all contaminants that are nearly immiscible in water, since the boiling point of the mixture of two immiscible fluids will always be less than the boiling point of either component by itself.

By pulling moisture and contaminants towards the heater wells, the risk of spreading the contamination deeper or outside the heater well pattern is avoided.

If the soil contains a large amount of free water, the process can be initiated by pumping through the manifold to remove the free water, followed by surface heating. This process can be repeated several times by adding water, heating to create steam distillation, adding more water, reheating etc. This repetition can result in still lower levels of residual contamination. In that case, some wells will need to be perforated only near the bottom.

The decontamination process disclosed herein can be applied in soils which have low in situ moisture content or high contaminant levels relative to moisture content. Unlike other decontamination processes that rely on electrical conduction through the soil, this invention relies only on thermal conduction through the soil. It can therefore be applied in completely dry soils and at temperatures beyond the boiling point of water. Moreover, since the thermal conductivity of soils has relatively little variation compared to their electrical conductivity, this thermal conduction decontamination process results in substantially more uniform heating than processes that rely on electrical conduction through the soil.

In an additional method of practicing this invention, once the heating section and pumping manifold 39 is in place, and a section evacuated and heated, various gases and liquids can be injected through the heater wells 11 or through openings in the impermeable flexible sheet 29. Thus, for example, water, oxygen, hydrogen peroxide, superheated steam, alkalies or acids, or other reactants could be injected to further remove or decompose the contaminants, as required.

These and other variations of the means and methods disclosed herein are to be construed as included within the scope of this invention.

We claim:

1. A method of remediating soil comprising the steps of:
    emplacing a pattern of heater wells in the soil;
    installing electrical heating elements in said heater wells;
    pulling a vacuum through said heater wells;
    applying electrical power to said electrical heating elements;
    heating the soil by thermal conduction from said heater wells; and decreasing the amount of contaminants in the soil.

2. The method of claim 1 further including the step of placing an impermeable flexible sheet over the soil surface.

3. The method of claim 1 further including encasing said heater wells in a perforated tubular casing.

4. The method of claim 2 further including the step of injecting fluids or gases through said heater wells or said impermeable flexible sheet in order to further remove or decompose the contaminants in the soil.

5. The method of claim 1 further including the step of equipping said heater wells with a catalyst to accelerate decomposition of the contaminants within the heater wells.

6. The method of claim 1 further including the steps of collecting and separating the water vapor and contaminants; and
 disposing of said concentrated contaminants removed from the soil by incineration, catalytic oxidation or chemical transformation.

7. A method of remediating soils comprising the steps of:
 emplacing a pattern of heater wells in the soil;
 installing electrical heating elements in said heater wells;
 placing an impermeable flexible sheet and thermally insulating layer over the soil surface;
 pulling a vacuum through said heater wells;
 sealing the surface soil by said flexible sheet;
 applying electrical power to said electrical heating elements;
 heating the soil by thermal conduction from said heater wells; and
 decreasing the amount of contaminants in the soil.

8. The method of claim 7 further including encasing said heater wells in a perforated casing.

9. The method of claim 7 further including the step of injecting fluids or gases through said heater wells or openings in said impermeable flexible sheet in order to further remove or decompose the contaminants in the soil.

10. The method of claim 7 further including the step of equipping said heater wells with a catalyst to accelerate decomposition of the contaminants within the heater wells.

11. The method of claim 7 further including the steps of collecting and separating the water vapor and contaminants; and
 disposing of said concentrated contaminants removed from the soil by incineration, catalytic oxidation or chemical transformation.

* * * * *